United States Patent [19]

Février et al.

[11] Patent Number: 4,675,637
[45] Date of Patent: Jun. 23, 1987

[54] SUPERCONDUCTING STATIC MACHINE HAVING A MAGNETIC CIRCUIT

[75] Inventors: Alain Février, Maurepas; Jean-Claude Kermarrec, Vélizy Villacoublay; Gérard Bottini, Lardy, all of France

[73] Assignee: Alsthom-Atlantique, Paris, France

[21] Appl. No.: 730,519

[22] Filed: May 6, 1985

[30] Foreign Application Priority Data

May 2, 1985 [FR] France ................................ 85 06681

[51] Int. Cl.⁴ .............................................. H01F 27/10
[52] U.S. Cl. ........................................ 336/58; 336/60; 336/90; 336/92; 336/DIG. 1
[58] Field of Search .............. 336/55, 57, 58, DIG. 1, 336/60, 90, 92, 94; 174/15 CA; 335/216; 62/514 R

[56] References Cited

U.S. PATENT DOCUMENTS 3,098,181  7/1963  Cioffi .................................. 335/216
3,208,019  9/1965  Stigant et al. ......................... 336/58

FOREIGN PATENT DOCUMENTS 2551254  8/1983  France .

OTHER PUBLICATIONS

G. Bronca et al., Revue Générale del'Electricité, vol. 83, No. 10, Oct. 1974, pp. 697–702.

Primary Examiner—Thomas J. Kozma
Attorney, Agent, or Firm—Sughrue, Mion, Zinn, Macpeak, and Seas

[57] ABSTRACT

A superconducting static machine having a magnetic circuit includes a magnetic circuit core at mere ambient temperature and very low (cryogenic) temperature windings (1A, 1B) and one or more magnetic circuit cores at considerably higher temperatures. The magnetic circuit core is disposed in a thermally-insulating chamber (3) which is itself disposed inside a very low temperature (9) containing the windings. The invention is particularly applicable to transformers.

8 Claims, 4 Drawing Figures

SUPERCONDUCTING STATIC MACHINE HAVING A MAGNETIC CIRCUIT

The present invention relates to superconducting static machines having a magnetic circuit, comprising superconducting windings at very low temperature and one or more magnetic circuit cores at considerably higher temperature. It is typically applicable to transformers.

French published patent application No. 2 551 254 dated Aug. 30th 1983 in the name of Alsthom-Atlantique relates to superconducting threads which are economically usable at industrial frequencies. These threads enable very high current densities, in the order of several times 109 A/m² to be obtained while presenting reduced losses at conventional industrial frequencies of 50 or 60 Hz. Under these conditions, the section of the magnetic circuit core can be very considerably reduced relative to the section of a conventional machine by increasing the number of ampere turns, thereby reducing the weight of the machine by a factor of about 10 and reducing the overall losses of the machine by a factor of about 3. In addition, the use of such conductors having a matrix of high electrical resistivity makes it possible to limit the excess current drawn from the machine in the event of a network "fault" (e.g. a short-circuit) to a few tens of percent, thereby considerably reducing problems related to the mechanical behaviour of the machine and to dimensions of auxiliary safety devices.

Since superconductivity is only obtained in the vicinity of the temperature of liquid helium, it is necessary to dispose the superconductive windings in a cryostat with the magnetic circuit core remaining at a considerably higher temperature, and preferably at close to ambient temperature, in order to reduce losses therein.

However, if annular metal cryostats are disposed around the arms of the magnetic circuit, excessively high losses appear due to induced currents. If the cryostats are made of insulating material, the junction problems are very complicated in that all-metal junctions are to be avoided because of induced currents, and any heating to temperatures of a few hundreds of degrees to provide the junction is to be avoided because of deterioration in the properties of the superconducting material.

The object of the present invention is thus to provide a zone of relatively high temperature (anti-cryostat) within a very low temperature medium (e.g. liquid helium) for containing the magnetic circuit core in a superconducting static machine having a magnetic circuit. By means of this anti-cryostat concept, the superconducting windings are made once this zone has been provided (no more heating problems) and the joint plane of the anti-cryostat extending parallel to the lines of magnetic force of the magnetic circuit makes it possible to avoid having any current flowing therein.

A superconducting static machine having a magnetic circuit in accordance with the invention is characterized in that the magnetic circuit core(s) is/are disposed in at least one thermally insulating chamber which is itself disposed inside a very low temperature chamber containing the windings.

The static machine preferably includes at least one of the following characteristics:

the chamber containing the magnetic circuit core results from joining two half-shells whose assembly plane is parallel to the lines of force of the magnetic circuit;

the magnetic circuit cores(s) is/are disposed directly inside the thermally insulating chamber and include an inside cooling channel;

the windings are wound on the magnetic circuit core(s) enclosed in their chamber;

the chamber containing the magnetic circuit is disposed inside a vacuum chamber of the same general shape containing a thermal insulator;

a chamber containing the magnetic circuit core or the magnetic circuit core itself is disposed inside a thermally insulated chamber of the same general shape and containing a thermal insulator;

the thermally-insulating chamber is supported by an inside chamber containing the magnetic circuit or by the magnetic circuit core itself via low heat loss supports;

the chamber(s) containing the magnetic circuit core is/are made of a composite insulating material or of an assembly of insulating materials providing helium sealing and electrical discontinuity in planes orthogonal to the lines of flux of the magnetic circuit; and the primary and secondary windings are interlocking and made by means of superconductive windings having a very highly resistive matrix.

There follows a description of a single phase transformer in accordance with the invention having primary and secondary superconducting, liquid helium cooled primary and secondary windings and a magnetic circuit core at a considerably higher temperature, given by way of example and with reference to the figures of the accompanying drawings.

Figure 1:
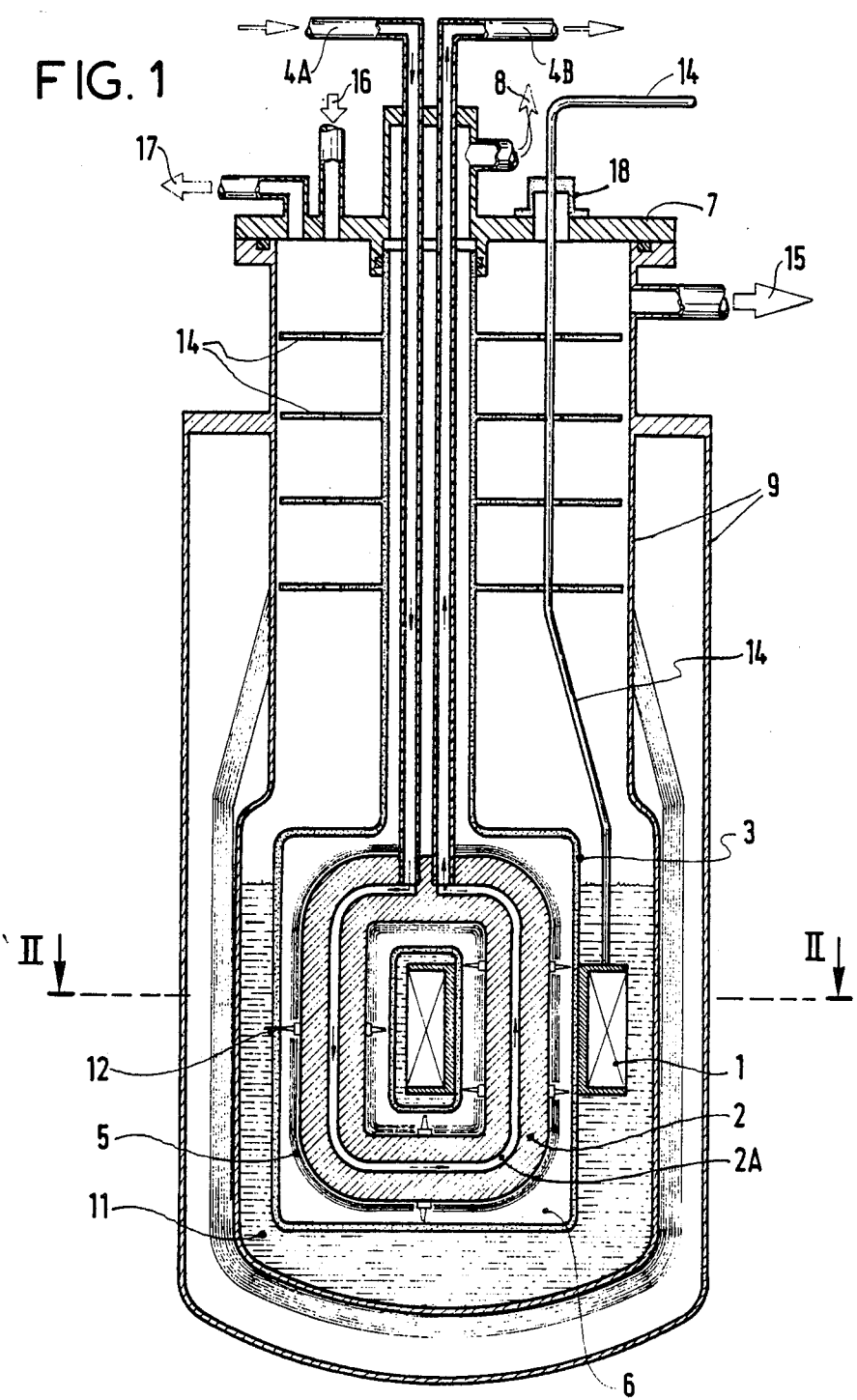
FIG. 1 is a section in a vertical plane through the transformer.
Figure 2:
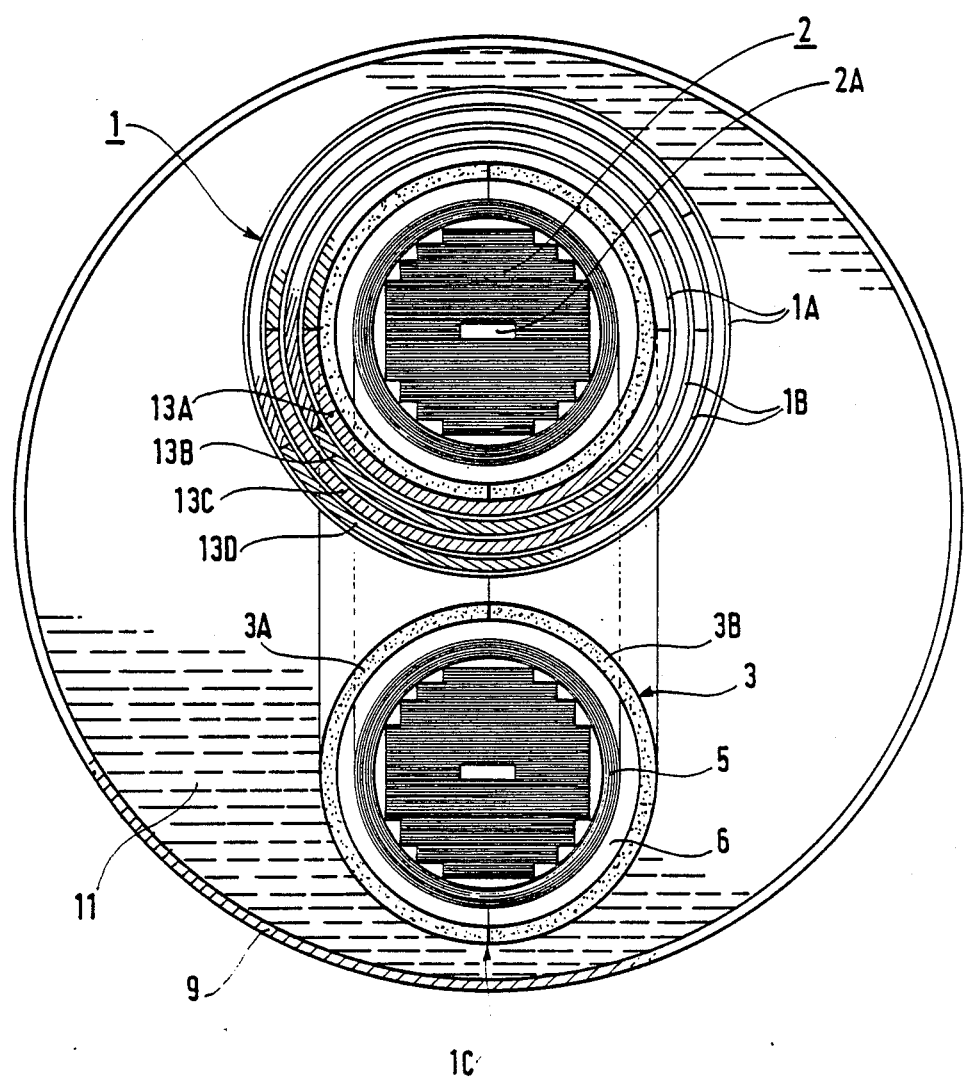
FIG. 2 is a section on a larger scale on a line II—II of FIG. 1.
Figure 3:
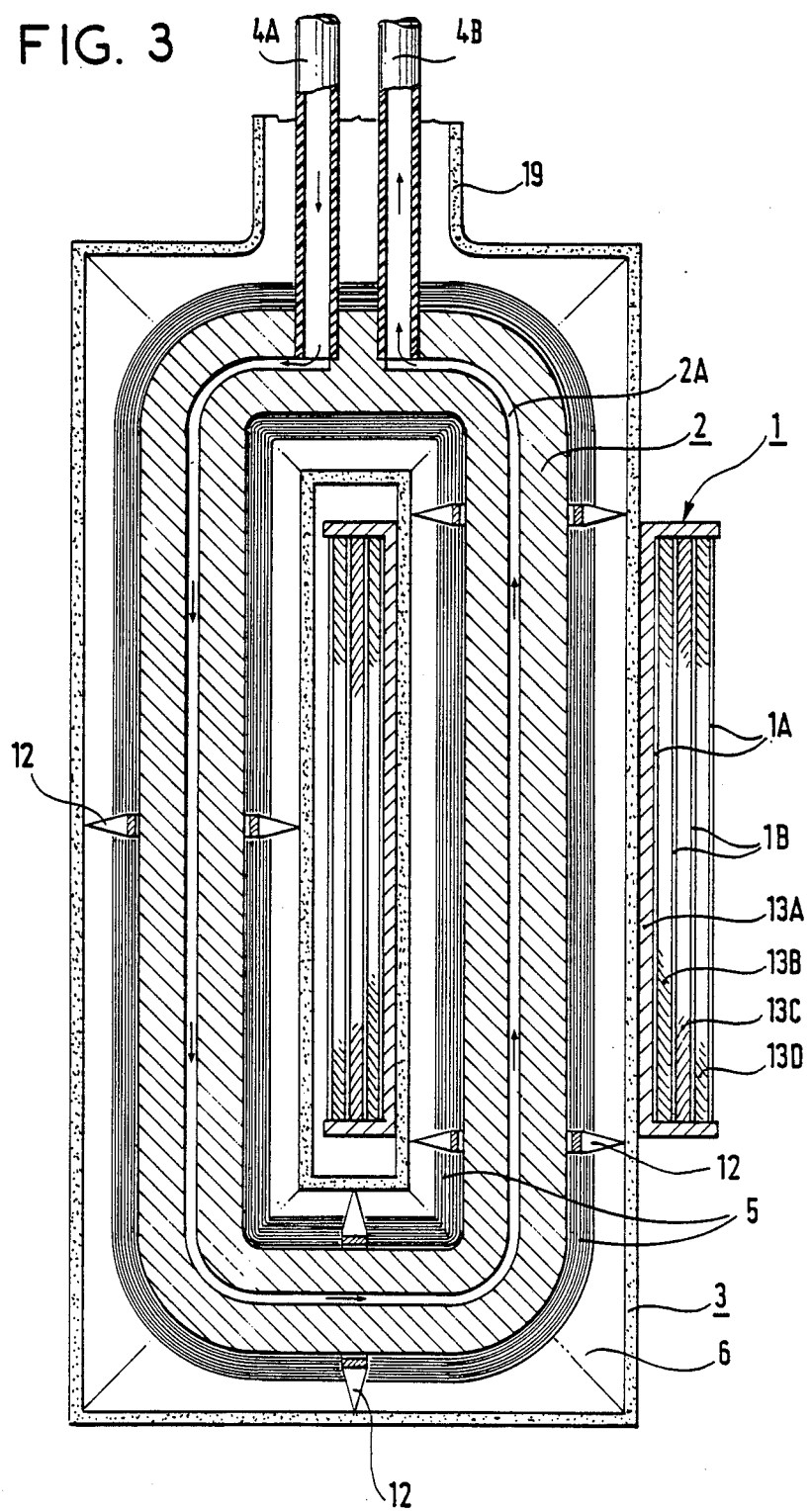
FIG. 3 is a vertical section on a larger scale through the magnetic circuit core and the windings of the transformer, together with the chamber enclosing the magnetic circuit core and the low heat loss centering devices centering the magnetic circuit core relative to the transformer windings.
Figure 4:
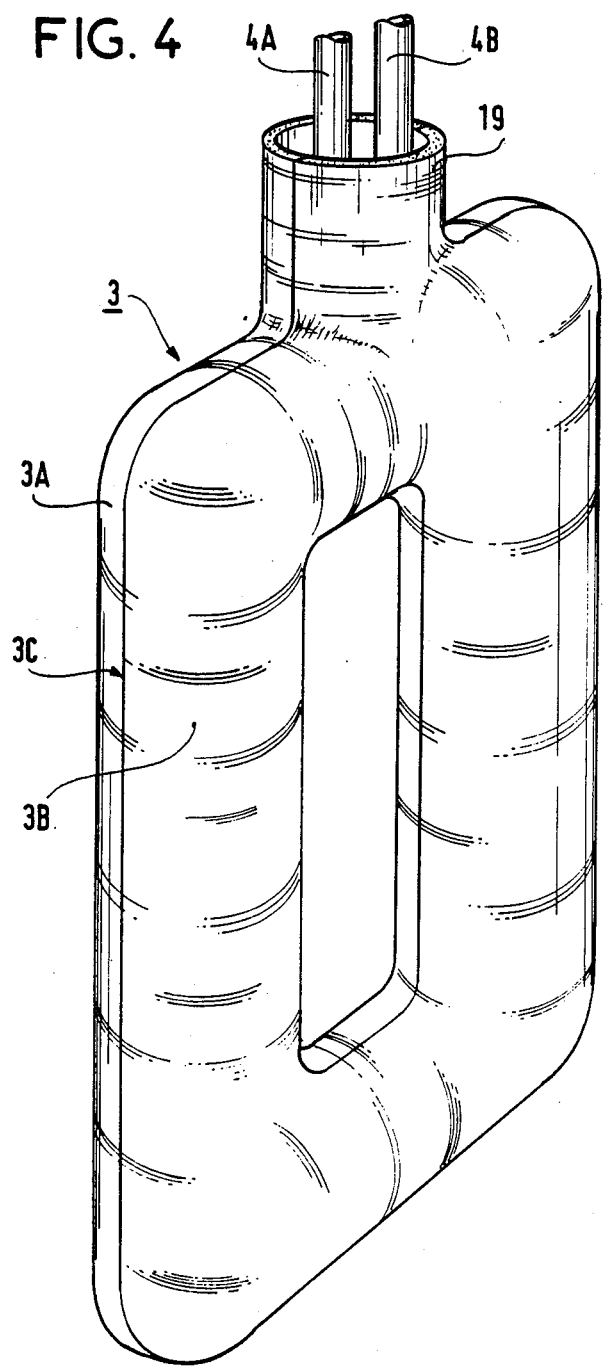
FIG. 4 is a perspective view of the sealed chamber of the magnetic circut core (anti-cryostat), which chamber is made up from two identical half-shells having a joint plane which is parallel to the magnetic circuit.

In FIGS. 1, 2 and 3, the interlocking primary and secondary windings are represented diagrammatically as 1A for the primary winding and 1B for the secondary winding.

The magnetic circuit core 2 is generally rectangular in shape and includes a sealed cooling channel 2A at its center. Two sealed tubes of insulating material 4A and 4B serve to admit and to remove the cooling fluid (air, oil, alcohol, helium vapor, etc.). These two tubes also support the weight of the assembly comprising the magnetic circuit core, the anti-cryostat, the superconducting windings, and the heat screens (14) against the ambient temperature lid 7 of the cryostat 9.

In a manner known per se, the cross-section of the magnetic circuit core 2 is stepped as shown in FIG. 2 so as to make as full a use as possible of the inside section of the chamber 3.

The chamber 3 at a temperature of 4.1° K. is under an internal vacuum 6 with pumping via the orifice 8.

The magnetic circuit core 2 is surrounded by a plurality of layers of super-insulator 5, made up of aluminumcoated strips of ethylene-glycol polyterephthalate (trade mark Mylar) intended to reduce radiant heat losses between the magnetic circuit core 2 at a temperature close to ambient and the chamber 3 at a temperature of 4.2° K. and surrounded by a bath of liquid helium 11.

Centering devices 12 providing very low heat losses serve to center the chamber 3 vertically and sideways relative to the magnetic circuit core 2.

The chamber 3 is made up of two identical half-shells 3A and 3B having a joint plane 3C which is parallel to the lines of force of the magnetic circuit core (FIG. 2).

It is constituted of various materials providing electrical sealing in planes orthogonal to the lines of flux of the magnetic circuit core (e.g. synthetic glass-resins, titanium ceramics, etc.); it is connected to the ambient temperature lid 7 by a low heat conduction tube having an internal vacuum 6.

The superconducting winding 1 is made up of primary windings 1A and interlocking secondary windings 1B. These windings are wound on mandrels made up of half-shells 13A, 13B, 13C and 13D centered on the chamber 3 and assembled as winding progresses (FIGS. 2 and 3). They are made from superconducting conductors having highly resistive matrices, in order to prevent excess currents which might otherwise appear under transformer fault conditions.

The windings 1 are connected to high and low tension circuits via four current risers represented by riser 14 (FIG. 1).

The assembly is suspended in a cryostat 9 containing liquid helium 11 and having a heat insulation between its coaxial shells, with helium vapor being evacuated via the orifice 15. Liquid helium filling takes place via the orifice 16. The wiring for helium level sensors and other measuring devices leaves via the orifice 17, and the four current risers 20 leave via insulating bases 18 in the lid 7.

We claim:

1. In a superconducting static machine having a magnetic circuit, the machine comprising very low temperature windings (1) and said magnetic circuit comprised of at least one or more magnetic circuit cores (2) at a considerably higher temperature, the improvement wherein the magnetic circuit core(s) is/are disposed in at least one thermally-insulating chamber (3), and said at least one thermally-insulating chamber (3) is disposed inside a very low temperature chamber containing the windings.

2. A machine according to claim 1, characterized in that the thermally-insulating chamber (3) containing the magnetic circuit are results from joining two half-shells (3A, 3B) whose assembly plane (30) is parallel to the lines of force of the magnetic circuit.

3. A machine according to claim 1 or 2, characterized in that the magnetic circuit core is directly disposed inside the thermally-insulating chamber (3) and include an inside cooling channel (2A).

4. A machine according to claim 1, characterized in that the low temperature windings (1) are wound on the magnetic circuit core enclosed in the thermally-insulating chamber (3).

5. A machine according to claim 1, characterized in that the magnetic circuit core (2) is disposed inside a thermal insulator (5) being of the same general shape as the thermally-insulating chamber (3).

6. A machine according to claim 5, characterized in that the thermally-insulating chamber (3) is supported by low heat loss supports (12) fixedly mounted to the magnetic circuit core (2).

7. A machine according to claim 1, wherein the thermally-insulating chamber is made of a composite insulating material and further includes means for providing helium sealing and electrical discontinuity in planes orthogonal to the lines of flux of the magnetic circuit.

8. A machine according to claim 1, wherein the windings (1) comprise interlocking primary and secondary windings (1A, 1B) comprising multifilament superconducting conductors having a highly resistive matrix.

* * * * *